United States Patent [19]

Ikeda et al.

[11] Patent Number: 5,138,692

[45] Date of Patent: Aug. 11, 1992

[54] OPTICAL FIBER BUILT-IN TYPE COMPOSITE INSULATOR

[75] Inventors: Mitsuji Ikeda, Nagoya; Masayuki Nozaki, Aichi; Masao Nishioka, Nagoya, all of Japan

[73] Assignee: NGK Insulators, Ltd., Japan

[21] Appl. No.: 672,106

[22] Filed: Mar. 19, 1991

[30] Foreign Application Priority Data

Mar. 28, 1990 [JP] Japan ................... 2-76707

[51] Int. Cl.$^5$ .............................................. G02B 6/36
[52] U.S. Cl. .................... 385/138; 174/139; 174/151; 385/100; 385/134; 385/147
[58] Field of Search ............... 350/96.10, 96.20, 96.21, 350/96.22, 96.29, 96.30, 96.23; 174/138 R, 139, 151, 152 R; 385/100, 101, 123, 134, 136-139, 147, 95

[56] References Cited

U.S. PATENT DOCUMENTS

| | | | |
|---|---|---|---|
| 3,825,320 | 7/1974 | Redfern | 350/96.22 |
| 4,214,809 | 7/1980 | Reh | 350/96.20 |
| 4,469,399 | 9/1984 | Cowen et al. | 350/96.20 |
| 4,610,033 | 9/1986 | Fox, Jr. | 350/96.23 X |
| 4,810,836 | 3/1989 | Shinoda et al. | 174/139 |
| 4,919,217 | 4/1990 | Mima et al. | 174/139 |
| 4,921,322 | 5/1990 | Seike et al. | 350/96.20 |
| 4,984,860 | 1/1991 | Seike et al. | 350/96.10 |
| 5,029,969 | 7/1991 | Seike et al. | 350/96.20 |
| 5,069,525 | 12/1991 | Seike et al. | 385/100 |

Primary Examiner—John D. Lee
Attorney, Agent, or Firm—Parkhurst, Wendel & Rossi

[57] ABSTRACT

An excellent optical fiber built-in type composite insulator of reduced damage rate in the producing operation and the handling operation thereof, reduced loss of initial light signal transmission and in a desired temperature range, and reduced trouble rate after thermal shock test, is provided. The optical fiber built-in type composite insulator of the present invention having a penetration hole in the central axis portion of the insulator, an optical fiber extending in the penetration hole, and an inorganic glass arranged at both end portions of the penetration hole for sealing the optical fiber therein, comprises protective tubes each having a bore of an inner diameter of substantially equal to the outer diameter of coating portion of the optical fiber to allow insertion of the coating portion of the optical fiber therethrough, each arranged in the penetration hole at such a position that a portion of a coating portion of the optical fiber and a portion of the coating-stripped portion of the optical fiber exist in each bore of the protective tube to protect the portions of the coating portion and the coating-stripped portion of the optical fiber in the both end portions of the penetration hole.

3 Claims, 2 Drawing Sheets

OPTICAL FIBER BUILT-IN TYPE COMPOSITE INSULATOR

BACKGROUND OF THE INVENTION

1. Field of the Invention

The present invention relates to an optical fiber built-in type composite insulator having an end portion sealed by an inorganic glass.

2. Related Art Statement

Heretofore, various structures of optical fiber built-in type composite insulator have been known. Among them, the structure of sealing the optical fiber at the both ends of penetration hole of an insulator with an inorganic glass has to bond a cladding of the optical and inorganic glass to each other, so that the portion of the optical fiber which bonds the inorganic glass has to be removed of its coating before the sealing.

Namely, an example of such structure is shown in the attached FIG. 3 wherein, when inserting an optical fiber 23 in a penetration hole 22 penetrating through the central axis portion of an insulator 2, the optical fiber 23 having a coating portion 23-1 is fixed at the middle portion of the penetration hole 22 by filling a rubbery elastomer or a resin, such as silicone rubber or epoxy resin, and a coating-removed or stripped portion 23-2 of the optical fiber 23 is sealed in the both end portions of the penetration hole 22 by means of an inorganic glass 25 to extend the coating portion 23-1 from the inorganic glass 25. The coating-stripped portion 23-2 and the coating portion 23-1 of the optical fiber 23 extending from the inorganic glass 23 to the exterior are directly protected by a protective layer 26 made of a rubbery elastomer or a resin, such as silicone rubber or epoxy resin. The coating-stripped portion 23-2 and the coating portion 23-1 of the optical fiber 23 extending from the inorganic glass 25 to the interior are protected by an inorganic or heat resistant organic adhesive layer 27 filled between the inorganic glass 25 and the middle portion of the penetration hole 22.

However, the abovementioned structure of the optical fiber built-in type composite insulator has a problem in that the optical fiber 23 is damaged at the coating portion 23-1 and/or the stripped portion 23-2, as described below.

Namely, as the stresses exerted on the optical fiber 23 from the exterior, there are forces unavoidably exerted during the sealing operation or the end-protecting operation, a stress accompanying expansion and shrinkage of the rubbery elastomer or resin 24 in the middle portion and the protective layer 26 of the penetration hole 22, and a force accompanying the handling of the optical fiber 23, such as fusion splicing, etc., after finishing the protection of the end portion of the penetration hole 22.

Therefore, there is a problem in that after the finishing of the sealing by means of the inorganic glass 25 and before the finishing of the protection of the coating-stripped portion 23-2 and the coating portion 23-1 extending from the sealing portion to the exterior, the optical fiber 23 is damaged due to an unavoidable force generated during the operation of forming the protection. There is also another problem in that, in case when the coating-stripped portion 23-2 and the coating portion 23-1 extending from the sealing portion of the inorganic glass 25 to the exterior were directly protected by the protective layer 26 (e.g., rubbery elastomer or resin), the extended portion of the optical fiber 23, particularly the coating-stripped portion 23-2 of weak mechanical strength is damaged by a stress generated by expansion and shrinkage of the protective layer 26 due to temperature change during use.

There is also a further problem in that, in case when the coating-stripped portion 23-2 and the coating portion 23-1 extending from the sealing inorganic glass portion 25 to the interior were protected by the heat resistant organic adhesive layer 27, the optical fiber 23 is similarly damaged. Meanwhile, in case when the extended portion of the optical fiber 23 was protected by the inorganic adhesive layer 27, there is a problem in that the inorganic adhesive layer 27 is fragile and liable to entrain air bubbles therein, so that it can not firmly fix the optical fiber 23 sufficiently, and the optical fiber 23, particularly the coating-stripped portion 23-2 of weak mechanical strength, is exerted by a stress generated by expansion and shrinkage of the rubbery elastomer or resin 24 filled in the middle portion of the penetration hole 22 due to temperature change during use, so that the optical fiber is also damaged.

Furthermore, there is also a problem in that, accompanying the expansion and shrinkage of the rubbery elastomer or resin 24 filled in the middle portion of the penetration hole 22, a bending stress is exerted on the portion of the optical fiber 23 existing on the interface between the adhesive 27 and the rubbery elastomer or resin 24, so that the optical fiber 23 is damaged.

SUMMARY OF THE INVENTION

An object of the present invention is to obviate the above-mentioned problems.

Another object of the present invention is to decrease damage rate of the optical fiber during operation and use.

A further object of the present invention is to provide an optical fiber built-in type composite insulator having improved light transmitting property and prolonged life of the optical fiber.

Now, the above objects can now be achieved by the present invention.

The present invention is an optical fiber built-in type composite insulator having a penetration hole in the central axis portion of the insulator, an optical fiber extending in the penetration hole, and an inorganic glass arranged at both end portions of the penetration hole for sealing the optical fiber therein, comprising protective tubes each having a bore of an inner diameter of substantially equal to the outer diameter of a coating portion of the optical fiber to allow insertion of the coating portion of the optical fiber therethrough each arranged in the penetration hole at such a position that a portion of the coating portion of the optical fiber and a portion of a coating-stripped portion of the optical fiber exist in each bore of the protective tube to protect the portions of the coating portion and the coating-stripped portion of the optical fiber in both end portions of the penetration hole.

BRIEF DESCRIPTION OF THE DRAWINGS

For a better understanding of the present invention, reference is made to accompanying drawings, in which.

NUMBERINGS IN THE DRAWINGS

Figure 1:
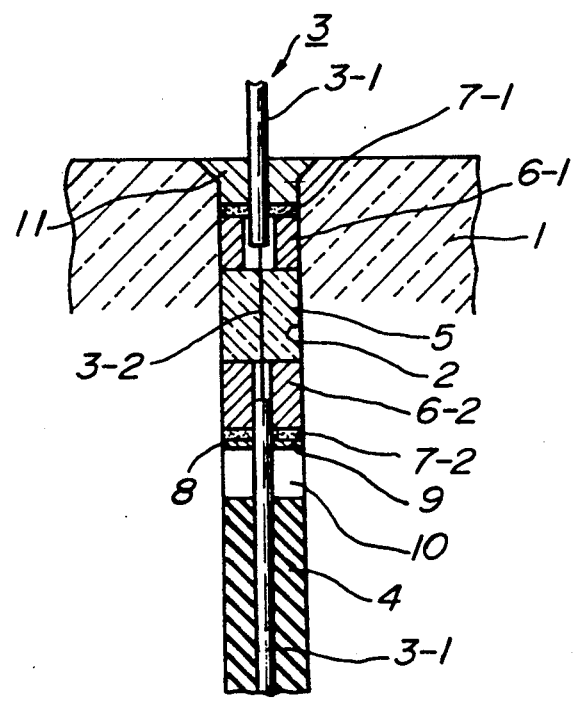
FIG. 1 is a schematic cross-sectional view of an end portion of an example of the present composite insulator.

1 ... insulator
2, 22 ... penetration hole
3, 23 ... optical fiber
3-1, 23-1 ... coating portion of the optical fiber
3-2, 23-2 ... coating-stripped portion of the optical fiber 3,23
4 ... silicone rubber
5, 25 ... inorganic glass
6-1, 6-2, 12 ... protective tube
7-1, 7-2, 27 ... adhesive layer
8 ... step
9 ... holder
10 ... buffering layer
11, 26 ... protective layer
24 ... rubbery elastomer or resin

DETAILED EXPLANATION OF THE INVENTION

In the aforementioned structure, the coating portion and the coating-stripped portion of the optical fiber are protected by inserting them in desired protective tubes, so that the stripped portion extending from the sealing inorganic glass portion can be immobilized and hence the optical fiber can be prevented from breakage at the stripped portion by a force exerted from the exterior. As a result, damage rate of the optical fiber during the production and operation of the composite insulator can be decreased, light transmitting property of the composite insulator can be improved, and the life of the optical fiber of the composite insulator can be prolonged.

Preferably, the inner bore of the protective tube has a diameter abutting the outer diameter of the coating portion of the optical fiber or has a clearance of not more than 0.1 mm from the outer diameter portion of the coating portion of the optical fiber. If the clearance exceeds 0.1 mm, the optical fiber may move within the inner bore of the protective tube, so that the optical fiber can not sufficiently be fixed therein and is occasionally broken.

If the optical fiber is fixed in the interior or in the end portions of the inner bore of the protective tube by means of an adhesive, such as modified acrylate adhesive or silicone resin, etc., the force exerted from the exterior on the coating-stripped portion extending from the sealing inorganic glass portion can further be mitigated and the optical fiber can further effectively be prevented from damage at the coating-stripped portion by the force exerted thereon from the exterior.

If the protective tube is fixed in the penetration hole of the insulator, the optical fiber can be prevented from damage caused by tottering of the protective tube in the penetration hole. If an appropriate buffering layer which allows free movement of the optical fiber is arranged between the protective tube and the rubbery elastomer or resin in the middle portion of the penetration hole, transmission loss of optical signal can be prevented from occurring, because the optical fiber can be bent with a larger radius of curvature than the permissible minimum radius of curvature of the optical fiber between the protective tube and the rubbery elastomer or resin when the rubbery elastomer or resin is expanded.

The buffering layer may be a space, however, preferably an insulative material, such as silicone oil, or $SF_6$ gas, etc., is incorporated therein to improve insulation property thereof.

DESCRIPTION OF THE PREFERRED EMBODIMENTS

Referring to FIG. 1, a cross-sectional view of an end portion of an embodiment of the optical fiber built-in type composite insulator of the present invention is shown. In the embodiment shown in FIG. 1, a structure of sealing the optical fiber 3 consisting of the coating portion 3-1 and the coating-stripped portion 3-2 which has removed the coating corresponding to the inorganic glass sealing portion beforehand in the penetration hole 2 in the central axis portion of the insulator 1 is shown. The sealing structure is accomplished by sealing the coating portion 3-1 in the middle portion of the penetration hole 2 with the silicone rubber 4, and sealing the coating-stripped portion 3-2 in the both end portions of the penetration hole 2 with the inorganic glass 5.

This embodiment has a characteristic feature that the coating portions 3-1 and the coating-stripped portions 3-2 arranged at the upper and lower neighboring portion of the sealing portion of the inorganic glass 5 are fixed by the glass or ceramic protective tubes 6-1, 6-2 preferably having an appropriate inner diameter to contact the coating portion 3-1 or an inner diameter having a clearance of not more than 0.1 mm from the outer diameter of the coating portion 3-1, and an outer diameter corresponding to the inner wall of the penetration hole 2 and capable of being inserted therein. The adhesive layer 7-2, the holder 9 fixed on the step portion 8 of the penetration hole 2, and the buffering layer 10 are arranged between the lower protective tube 6-2 and the silicone rubber 4, and the protective layer 11 made of silicone rubber is arranged on the upper protective tube 6-1 via the adhesive layer 7-1.

In this embodiment, the coating portion 3-1 of the optical fiber 3 is fixed in the inner bore or the end portion of the protective tube 6-1 (6-2) by means of an adhesive, and the outer circumferential portion of the protective tube 6-1 (6-2) and the penetration hole 2 are similarly fixed by means of an adhesive.

Figure 2:
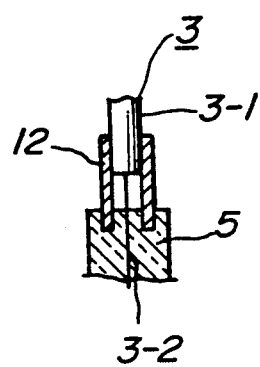
FIG. 2 is a schematic cross-sectional view of another example of the protective tube according to the present invention.
Figure 3:
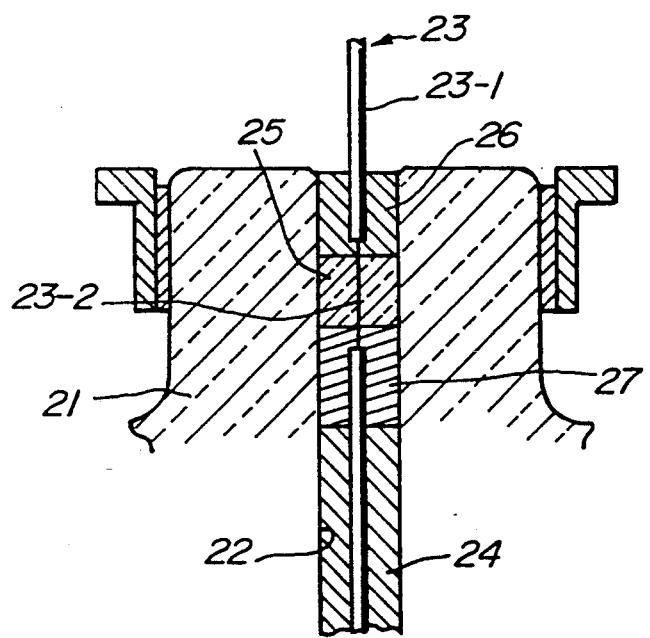
FIG. 3 is a schematic cross-sectional view of an end portion of an example of a conventional composite insulator.

Referring to FIG. 2, a structure of another embodiment of the protective tube is shown which can be used in the present invention. The protective tube 12 used in this embodiment has an inner diameter corresponding to the outer diameter of the coating portion 3-1 or an inner diameter having a clearance of not more than 0.1 mm from the outer diameter of the coating portion 3-1 similarly as in the above-mentioned protective tube 6-1 (6-2), however, has an outer diameter smaller than the inner diameter of the penetration hole 2, different from the abovementioned protective tube 6-1 (6-2). The protective tube 12 can also achieve the same effects as those of the abovementioned protective tube 6-1 (6-2), so far as the end portion of the protective tube 12 is embedded and fixed in the inorganic glass 5.

In producing the present composite insulator of the abovementioned structures, at first the optical fiber 3 having the preliminarily stripped coating corresponding to the sealing inorganic glass portion 5 is inserted in the penetration hole 2. The optical fiber 3 has a primer treatment on the coating thereof beforehand for improving the adhesivity of the coating to the silicone rubber 4.

Next, the silicone rubber 4 is filled and cured in the middle portion of the penetration hole 2. The silicone rubber 4 has a desired tensile strength and sufficient elongation at breakage so as not to deteriorate by thermal expansion and shrinkage thereof caused by temperature change in use environment.

Then, in order to provide the buffering layer 10 between the silicone rubber 4 and the protective tube 6-2, the holder 9 is arranged on the step portion 8 of the penetration hole 2, an adhesive is poured on the holder 9, the protective tube 6-2 is mounted on the adhesive, and the adhesive is cured to form the adhesive layer 7-2. The buffering layer 10 preferably has a thickness of at least 10 mm. The adhesive is a modified acrylate resin or a silicone resin.

Thereafter, a calcined body of an inorganic glass having a throughhole for the optical fiber and an appropriate shape suited to insertion thereof in the penetration hole is arranged on the protective tube 6-2, the other protective tube 6-1 is arranged on the calcined body of the inorganic glass, and then they are heated to melt the calcined body of the inorganic glass. The inorganic glass is a glass which has a lower coefficient of thermal expansion than that of the ceramic insulator and which can melt at a relatively low temperature in order to decrease the residual stress by means of sealing and to maintain the mechanical strength of the sealing glass portion against the thermal stress accompanying temperature change in use environment.

Finally, an adhesive is applied or poured and cured on the protective tube 6-1 in the penetration hole 2 to form the adhesive layer 7-1, and then the protective layer 11 consisting of a rubbery elastomer, such as silicone rubber, etc., is formed on the adhesive layer 7-1. The adhesive is a modified acrylate resin or a silicone resin.

Hereinafter, the present invention will be explained in more detail with reference to examples.

EXAMPLES

According to the aforementioned production method, optical fiber built-in type composite insulators of test Nos. 1-8 of the present invention and test Nos. 9-11 of conventional structures are prepared having the structures as shown in the following Table 1. The prepared composite insulators are measured on the damage rate and the light signal transmitting property.

The damage rate (%) of the optical fiber is determined by a rate of the number of damaged optical fiber during the sealing operation or the handling of the optical fiber after finishing the protecting operation of the end portion of the penetration hole to the whole number of tested optical fiber of the composite insulator. The light signal transmitting property is determined by an initial loss of light signal transmission (to be referred to as "LLST", hereinafter) at the time of assembling or preparing the composite insulator and LLST change accompanying temperature change in a range of between −20° C. and 80° C. each by an average value of each 10 samples at each level of measurements of LLST by means of interpolation. In addition, for expressing trouble rate after thermal shock test, thermal shock tests are effected using 1 cycle of a high temperature of 80° C. for 30 min and a low temperature of −20° C. for 30 min with each 10 samples at each level, and expressed trouble rate of 0% with a symbol ⊙, 10–20% with a symbol Δ, and 30% or more with a symbol x in the following Table 3. The word "trouble" used herein means the breakage of the optical fiber or LLST of not less than 50%. Trouble rates of the optical fiber are shown in the following Table 2, and the light signal transmission property of the optical fiber is shown in the following Table 3.

TABLE 1

| Test No. | | Protective tube outer | Protective tube inner | Adhesive | Buffering layer thickness (mm) | Fixing of protective tube | Protective layer | Inner adhesive layer of sealing glass portion in conventional structure |
|---|---|---|---|---|---|---|---|---|
| Invention | 1 | yes | yes | modified acrylate resin | 0 | yes | silicone rubber | — |
| | 2 | " | " | modified acrylate resin | 2 | " | silicone rubber | — |
| | 3 | " | " | modified acrylate resin | 3 | " | silicone rubber | — |
| | 4 | " | " | modified acrylate resin | 10 | " | silicone rubber | — |
| | 5 | " | " | modified acrylate resin | 15 | " | silicone rubber | — |
| | 6 | " | " | modified acrylate resin | 15 | none | silicone rubber | — |
| | 7 | " | " | silicon resin | 15 | yes | silicone rubber | — |
| | 8 | " | " | none | 15 | " | silicone rubber | — |
| Conventional | 9 | none | none | — | — | — | silicone rubber | inorganic adhesive |
| | 10 | " | " | — | — | — | epoxy resin | " |
| | 11 | " | " | — | — | — | silicone rubber | heat resistant organic adhesive |

TABLE 2

| | | Damage rate of optical fiber (%) | |
|---|---|---|---|
| Test No. | | During production | During handling after finishing protection of terminal portion |
| Invention | 1 | 0 | 0 |
| | 2 | 0 | 0 |
| | 3 | 0 | 0 |
| | 4 | 0 | 0 |
| | 5 | 0 | 0 |
| | 6 | 10 | 10 |
| | 7 | 0 | 0 |
| | 8 | 0 | 10 |
| Conventional | 9 | 30 | 20 |
| | 10 | 20 | 10 |

TABLE 2-continued

| | Damage rate of optical fiber (%) | |
|---|---|---|
| Test No. | During production | During handling after finishing protection of terminal portion |
| 11 | 40 | 20 |

TABLE 3

| | | Initial LLST [dbm at ambient temperature] | LLST change accompanying temperature change [dbm −20~80° C.] | Trouble rate after thermal shock test (%) | | | |
|---|---|---|---|---|---|---|---|
| | | | | 1000 cycle | 2000 cycle | 3000 cycle | 4000 cycle |
| Invention | 1 | 2.1 ± 1.0 | 3.1 ± 0.8 | ⊚ | Δ | x | |
| | 2 | 1.8 ± 0.7 | 2.4 ± 0.6 | ⊚ | ⊚ | x | |
| | 3 | 1.2 ± 0.4 | 1.7 ± 0.5 | ⊚ | ⊚ | ⊚ | Δ |
| | 4 | 1.0 ± 0.3 | 1.3 ± 0.4 | ⊚ | ⊚ | ⊚ | ⊚ |
| | 5 | 0.8 ± 0.3 | 0.9 ± 0.3 | ⊚ | ⊚ | ⊚ | ⊚ |
| | 6 | 1.0 ± 0.4 | 1.1 ± 0.3 | ⊚ | ⊚ | ⊚ | x |
| | 7 | 0.8 ± 0.3 | 0.9 ± 0.3 | ⊚ | ⊚ | ⊚ | ⊚ |
| | 8 | 1.9 ± 0.8 | 2.5 ± 0.8 | ⊚ | ⊚ | x | |
| Conventional | 9 | 3.1 ± 0.7 | 6.2 ± 1.5 | x | | | |
| | 10 | 4.0 ± 0.9 | 8.5 ± 3.2 | x | | | |
| | 11 | 3.5 ± 1.0 | 7.8 ± 2.1 | x | | | |

As seen from the results shown in Tables 2 and 3, the test Nos. 1-8 of the present invention as compared with the test Nos. 9-11 of the conventional examples have reduced damage rate both in the producing operation and in the handling after the finishing of the protection of the end portion of the penetration hole of the insulator, and remarkably reduced initial LLST and LLST in a desired temperature range as well as noticeably reduced trouble rate after thermal shock test.

Though a sealing structure of only one end portion of the penetration hole of the insulator is shown in the above embodiments, the other end portion of the penetration hole of the insulator can of course similarly be sealed by the same sealing structure.

As explained in detail in the foregoing explanation, in the optical fiber built-in type composite insulator of the present invention, the coating portion and the coating-stripped portion of the optical fiber are inserted and protected in a desired protective tube to immobilize the stripped portion extending from the sealing inorganic glass portion, and the adhesive layer is provided to fix the optical fiber and the protective tube to the inner wall of the penetration hole thereby to prevent the stripped portion of the optical fiber extending from the sealing inorganic glass portion from being directly exerted by a force from the exterior, so that the damage of the optical fiber at the stripped portion caused by the force exerted from the exterior can be prevented from occurring. As a result, the damage rate of the optical fiber during the producing operation and the handling operation can be reduced, the light signal transmitting property can be improved, and the life of the optical fiber can be prolonged.

By the provision of the buffering layer which allows free movement of the optical fiber between the sealing inorganic glass portion and the rubbery elastomer or resin in the middle portion of the penetration hole, the loss of light signal transmission accompanying thermal expansion and shrinkage of the rubbery elastomer or resin can be prevented from increasing.

Although the present invention has been explained with specific examples and numeral values, it is of course apparent to those skilled in the art that various changes and modifications thereof are possible without departing from the broad spirit and aspect of the present invention as defined in the appended claims.

What is claimed is:

1. An optical fiber built-in type composite insulator having a penetration hole in the central axis portion of the insulator, an optical fiber extending in the penetration hole, and an inorganic glass arranged at both end portions of the penetration hole for sealing the optical fiber therein, comprising protective tubes each having a bore of an inner diameter of substantially equal to the outer diameter of a coating portion of the optical fiber to allow insertion of the coating portion of the optical fiber therethrough each arranged in the penetration hole at such a position that a portion of the coating portion of the optical fiber and a portion of a coating-stripped portion of the optical fiber exist in each bore of the protective tube to protect the portion of the coating portion and the coating-stripped portion of the optical fiber in the both end portions of the penetration hole.

2. The optical fiber built-in type composite insulator as defined in claim 1, further comprising an adhesive layer arranged on and in the protective tube for fixing the optical fiber in the protective tube and to the penetration hole.

3. The optical fiber built-in type composite insulator as defined in claim 1, further comprising a sealing rubbery elastomer or resin arranged in the central axis portion of the penetration hole for providing a buffering layer which allows free movement of the optical fiber between the inorganic glass and the rubbery elastomer or resin.

* * * * *